US012652311B2

(12) United States Patent
King et al.

(10) Patent No.: US 12,652,311 B2
(45) Date of Patent: Jun. 9, 2026

(54) PRESERVATION OF NETWORK INTEGRITY IN CHANGING NETWORK CONDITIONS TRIGGERED BY DATA HARVESTING FOR RETROSPECTIVE DECRYPTION

(71) Applicant: Bank of America Corporation, Charlotte, NC (US)

(72) Inventors: Adam Kristian King, Fort Mill, SC (US); James Siekman, Charlotte, NC (US); Sanjay Lohar, Charlotte, NC (US); Matthew Bryant, Mount Holly, NC (US); Catherine Cunningham, Charlotte, NC (US); Takiyah Watford, Fort Mill, SC (US); Elizabeth Swanzy-Parker, Charlotte, NC (US); Peter Nein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 119 days.

(21) Appl. No.: 18/811,889

(22) Filed: Aug. 22, 2024

(65) Prior Publication Data
US 2026/0058985 A1     Feb. 26, 2026

(51) Int. Cl.
G06F 21/00          (2013.01)
H04L 9/40           (2022.01)

(52) U.S. Cl.
CPC ...... H04L 63/1441 (2013.01); H04L 63/1416 (2013.01); H04L 63/1425 (2013.01)

(58) Field of Classification Search
CPC ............. H04L 63/1441; H04L 63/1416; H04L 63/1425
See application file for complete search history.

(56) References Cited

U.S. PATENT DOCUMENTS

| | | | |
|---|---|---|---|
| 2005/0044406 A1* | 2/2005 | Stute .................... | C12Q 1/6865 713/153 |
| 2013/0227689 A1* | 8/2013 | Pietrowicz .............. | H04L 43/12 726/23 |

(Continued)

OTHER PUBLICATIONS

Geambasu et al "Vanish: Increasing Data Privacy with Self-Destructing Data", 18th USENIX Security Symposium, pp. 299-315, 2009 (Year: 2009).*

*Primary Examiner* — Michael M Lee

(74) *Attorney, Agent, or Firm* — Weiss & Arons LLP

(57) ABSTRACT

A method for enhancing security of data, code, and/or network components by introducing a layer of integrity management that adapts to changing conditions within a network. The method may include use of a processor to perform intrusion analysis using an intrusion detection system and/or prevention system, behavioral analysis by accessing user logs to see if behavior is within a normal range, and/or geolocation analysis to see if the piece of data, section of code, and/or network component are within their usual surroundings. When there is a concern of a data breach, leak, and/or hack, the processor may initiate a response that detects other pieces of data, sections of code, and/or network components in proximity, initiates a self-destruct mechanism, triggers hardware to perform outside of operational specifications, and contains the spread of the data breach, leak, and/or hack through shutdown procedures, isolating affected systems, and/or alerting security personnel.

18 Claims, 8 Drawing Sheets

(56) References Cited

U.S. PATENT DOCUMENTS

| | | | | |
|---|---|---|---|---|
| 2022/0038500 | A1* | 2/2022 | Mukherjee | H04L 63/1416 |
| 2022/0086181 | A1* | 3/2022 | Richman | H04L 63/0892 |
| 2024/0171397 | A1* | 5/2024 | Arora | G06F 21/566 |

* cited by examiner

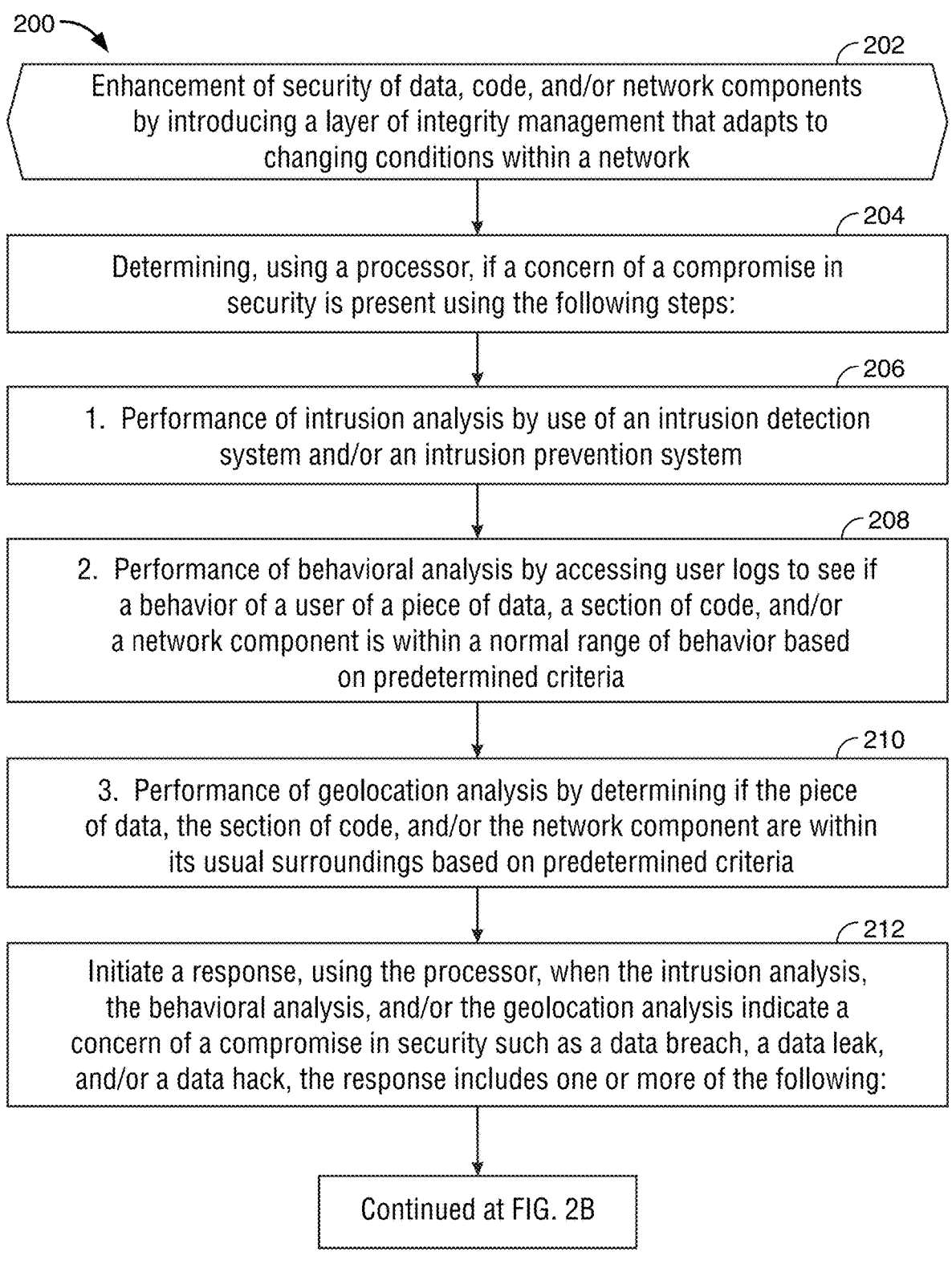

200

202
Enhancement of security of data, code, and/or network components by introducing a layer of integrity management that adapts to changing conditions within a network 204
Determining, using a processor, if a concern of a compromise in security is present using the following steps:

206
1. Performance of intrusion analysis by use of an intrusion detection system and/or an intrusion prevention system 208
2. Performance of behavioral analysis by accessing user logs to see if a behavior of a user of a piece of data, a section of code, and/or a network component is within a normal range of behavior based on predetermined criteria 210
3. Performance of geolocation analysis by determining if the piece of data, the section of code, and/or the network component are within its usual surroundings based on predetermined criteria 212
Initiate a response, using the processor, when the intrusion analysis, the behavioral analysis, and/or the geolocation analysis indicate a concern of a compromise in security such as a data breach, a data leak, and/or a data hack, the response includes one or more of the following:

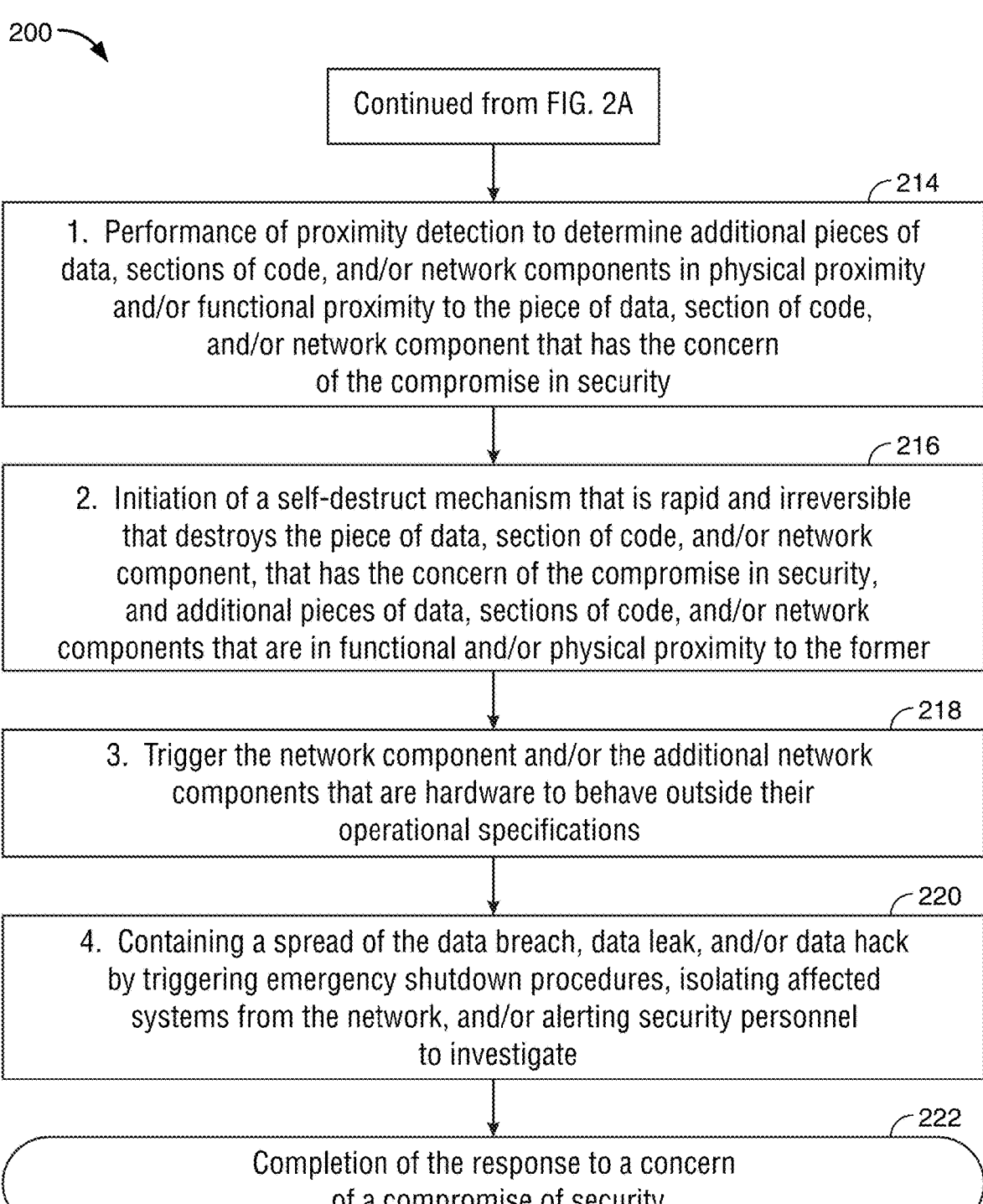

200

Continued from FIG. 2A

/214

1.  Performance of proximity detection to determine additional pieces of data, sections of code, and/or network components in physical proximity and/or functional proximity to the piece of data, section of code, and/or network component that has the concern of the compromise in security

/216

2.  Initiation of a self-destruct mechanism that is rapid and irreversible that destroys the piece of data, section of code, and/or network component, that has the concern of the compromise in security, and additional pieces of data, sections of code, and/or network components that are in functional and/or physical proximity to the former

/218

3.  Trigger the network component and/or the additional network components that are hardware to behave outside their operational specifications

/220

4.  Containing a spread of the data breach, data leak, and/or data hack by triggering emergency shutdown procedures, isolating affected systems from the network, and/or alerting security personnel to investigate

/222

Completion of the response to a concern of a compromise of security

FIG. 2B

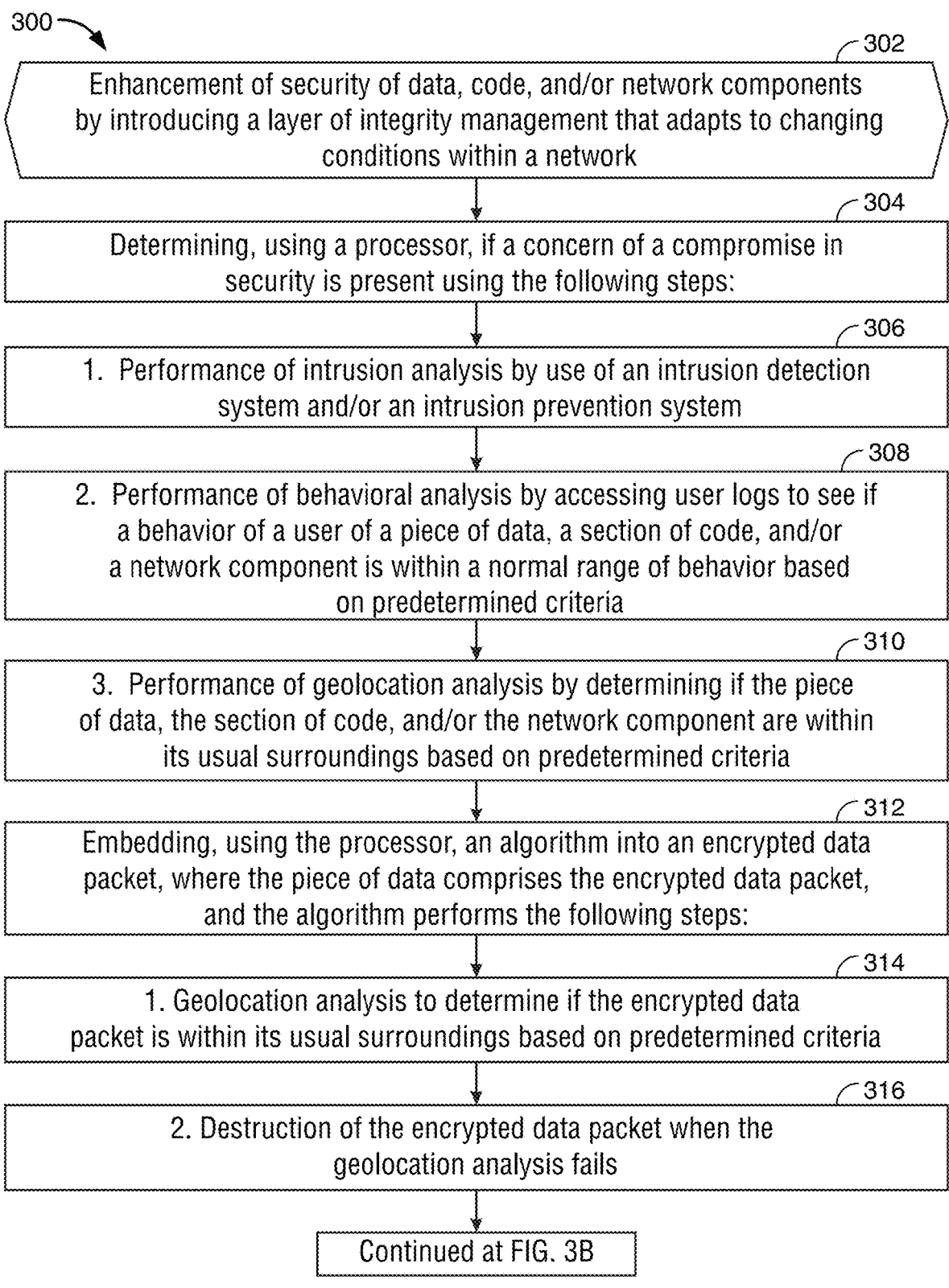

300

302

Enhancement of security of data, code, and/or network components
by introducing a layer of integrity management that adapts to changing
conditions within a network

304

Determining, using a processor, if a concern of a compromise in
security is present using the following steps:

306

1.  Performance of intrusion analysis by use of an intrusion detection
system and/or an intrusion prevention system

308

2.  Performance of behavioral analysis by accessing user logs to see if
a behavior of a user of a piece of data, a section of code, and/or
a network component is within a normal range of behavior based
on predetermined criteria

310

3.  Performance of geolocation analysis by determining if the piece
of data, the section of code, and/or the network component are within
its usual surroundings based on predetermined criteria

312

Embedding, using the processor, an algorithm into an encrypted data
packet, where the piece of data comprises the encrypted data packet,
and the algorithm performs the following steps:

314

1. Geolocation analysis to determine if the encrypted data
packet is within its usual surroundings based on predetermined criteria

316

2. Destruction of the encrypted data packet when the
geolocation analysis fails

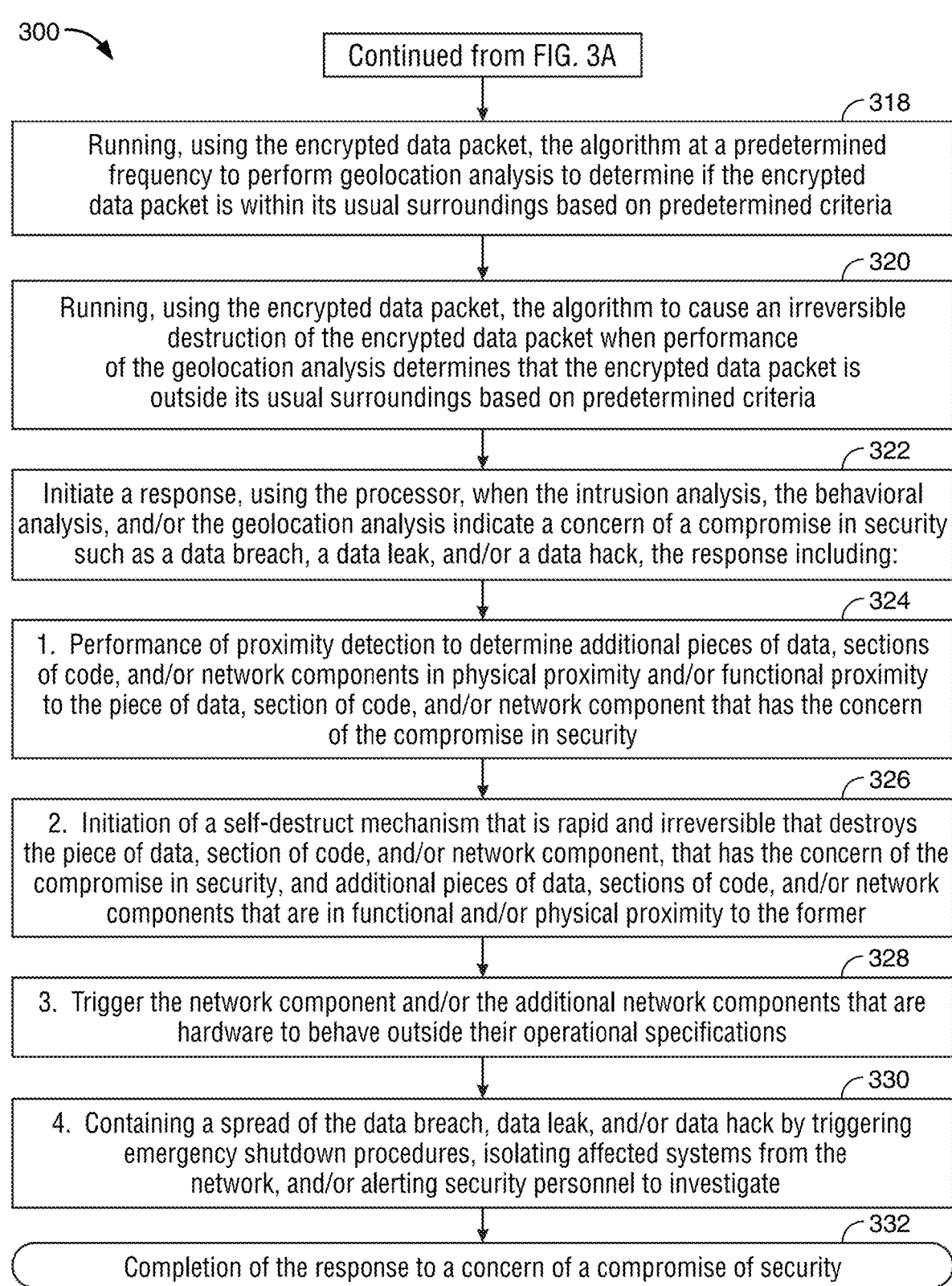

300

Continued from FIG. 3A

318

Running, using the encrypted data packet, the algorithm at a predetermined frequency to perform geolocation analysis to determine if the encrypted data packet is within its usual surroundings based on predetermined criteria

320

Running, using the encrypted data packet, the algorithm to cause an irreversible destruction of the encrypted data packet when performance of the geolocation analysis determines that the encrypted data packet is outside its usual surroundings based on predetermined criteria

322

Initiate a response, using the processor, when the intrusion analysis, the behavioral analysis, and/or the geolocation analysis indicate a concern of a compromise in security such as a data breach, a data leak, and/or a data hack, the response including:

324

1. Performance of proximity detection to determine additional pieces of data, sections of code, and/or network components in physical proximity and/or functional proximity to the piece of data, section of code, and/or network component that has the concern of the compromise in security

326

2. Initiation of a self-destruct mechanism that is rapid and irreversible that destroys the piece of data, section of code, and/or network component, that has the concern of the compromise in security, and additional pieces of data, sections of code, and/or network components that are in functional and/or physical proximity to the former

328

3. Trigger the network component and/or the additional network components that are hardware to behave outside their operational specifications

330

4. Containing a spread of the data breach, data leak, and/or data hack by triggering emergency shutdown procedures, isolating affected systems from the network, and/or alerting security personnel to investigate

332

Completion of the response to a concern of a compromise of security

FIG. 3B

PRESERVATION OF NETWORK INTEGRITY IN CHANGING NETWORK CONDITIONS TRIGGERED BY DATA HARVESTING FOR RETROSPECTIVE DECRYPTION

FIELD OF TECHNOLOGY

Aspects of the disclosure relate to the use of data integrity management to secure network integrity under changing network conditions.

BACKGROUND

Data breaches, leaks, and hacks into the host's systems and/or data pose significant threats to the security and integrity of the host's sensitive information, often resulting in widespread damage to the host and exploitation of host's sensitive information. Damage may be realized when compromised data is misappropriated such as by selling the data or access to the data, for example, on the dark web.

Existing security measures struggle to contain the aftermath of such incidents, allowing unauthorized code of the third party to proliferate and exploit the host's compromised environments. There is a pressing need for a proactive solution that can mitigate the impact of data breaches, thereby safeguarding the host's sensitive information from malicious exploitation and unauthorized access by the third party.

Computational power continues to grow exponentially. Existing encryption methods face a persistent challenge from post-quantum computing vulnerability encapsulated in the phrase "harvest now, decrypt later," where encrypted data could be stored indefinitely, awaiting retrospective decryption. Retrospective decryption poses a significant security risk, as advances in computing power and decryption techniques compromise sensitive and confidential encrypted information over time.

There is a need to provide improved network security after intrusion by a malicious third party into a network.

There is a need to provide improved deterrence to malicious third party seeking to misappropriate data and components within a network.

There is a need to provide improved data security when stolen data finds itself in different environments.

SUMMARY

It is an object of the invention to provide improved network security after intrusion by a malicious third party into a network.

It is a further object of the invention to provide improved deterrence to malicious third party seeking to misappropriate data and components within a network. For example, malicious efforts of a third party may be defused by ensuring the destruction of unauthorized code of the third party and its immediate proximity in the host.

It is another object of the invention to provide improved data security as stolen data finds itself in different environments.

A method for enhancing security of data, code, and/or network components by introducing a layer of integrity management that adapts to changing conditions within a network.

The method may include use of a processor to perform intrusion analysis. Performance of intrusion analysis may use an intrusion detection system and/or an intrusion prevention system.

The method may include use of the processor to perform behavioral analysis. Performance of behavioral analysis may include accessing user logs to see if the behavior of a user of a piece of data, a section of code, and/or a network component are within a normal range of behavior based on predetermined criteria.

The method may include use of the processor to perform geolocation analysis. Performance of geolocation analysis may include determining if the piece of data, the section of code, and/or the network component are within its usual surroundings based on predetermined criteria.

When the intrusion analysis, the behavioral analysis, and/or the geolocation analysis indicate a concern of a compromise in security, the processor may initiate a response. The compromise in security may include a data breach, a data leak, or a data hack.

The response may include the processor performing proximity detection to determine an additional piece of data, section of code, and/or network component in physical proximity and/or functional proximity to the piece of data, section of code, or network component that has the concern of the compromise in security. Determination of functional proximity may include analyzing network traffic, system logs, and/or user activity. Determination of physical proximity may include analyzing relative locations to each other using GPS, cell phone towers, Wi-Fi access points, and/or an IP address location within a directory.

The response may include the processor initiating a self-destruct mechanism that is rapid and/or irreversible. The self-destruct mechanism may destroy the piece of data, section of code, and/or network component that have the concern of the compromise in security. The self-destruct mechanism may destroy additional piece of data, section of code, and/or network component in functional proximity and/or physical proximity to the piece of data, section of code, and/or network component that have the concern of the compromise in security.

The response may include the processor triggering the network component and/or the additional network component, when they are hardware, to behave outside their operational specifications. Behaving outside operation specifications may include overheating circuits, sustained over-clocking of processor chips, bypassing safety alarms, and/or triggering built-in destruction mechanisms.

The response may include the processor containing the spread of the data breach, data leak, data hack, or the like by triggering emergency shutdown procedures, isolating affected systems from the network, and/or alerting security personnel to investigate.

The network component and/or the additional network component may include hardware and/or software.

The user logs may include a recording of a set of user actions.

The processor may determine the geolocation of the piece of data, the section of code and/or the network using GPS, cell phone towers, Wi-Fi access points and/or an IP address location within a directory.

The processor may use a self-destruct mechanism embedded within software applications, scripts, and/or data repositories.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2A shows an illustrative flowchart in accordance with principles of the disclosure;

FIG. 2B shows an illustrative flowchart in accordance with principles of the disclosure;

FIG. 3A shows an illustrative flowchart in accordance with principles of the disclosure;

FIG. 3B shows an illustrative flowchart in accordance with principles of the disclosure;

DETAILED DESCRIPTION

Figure 1:
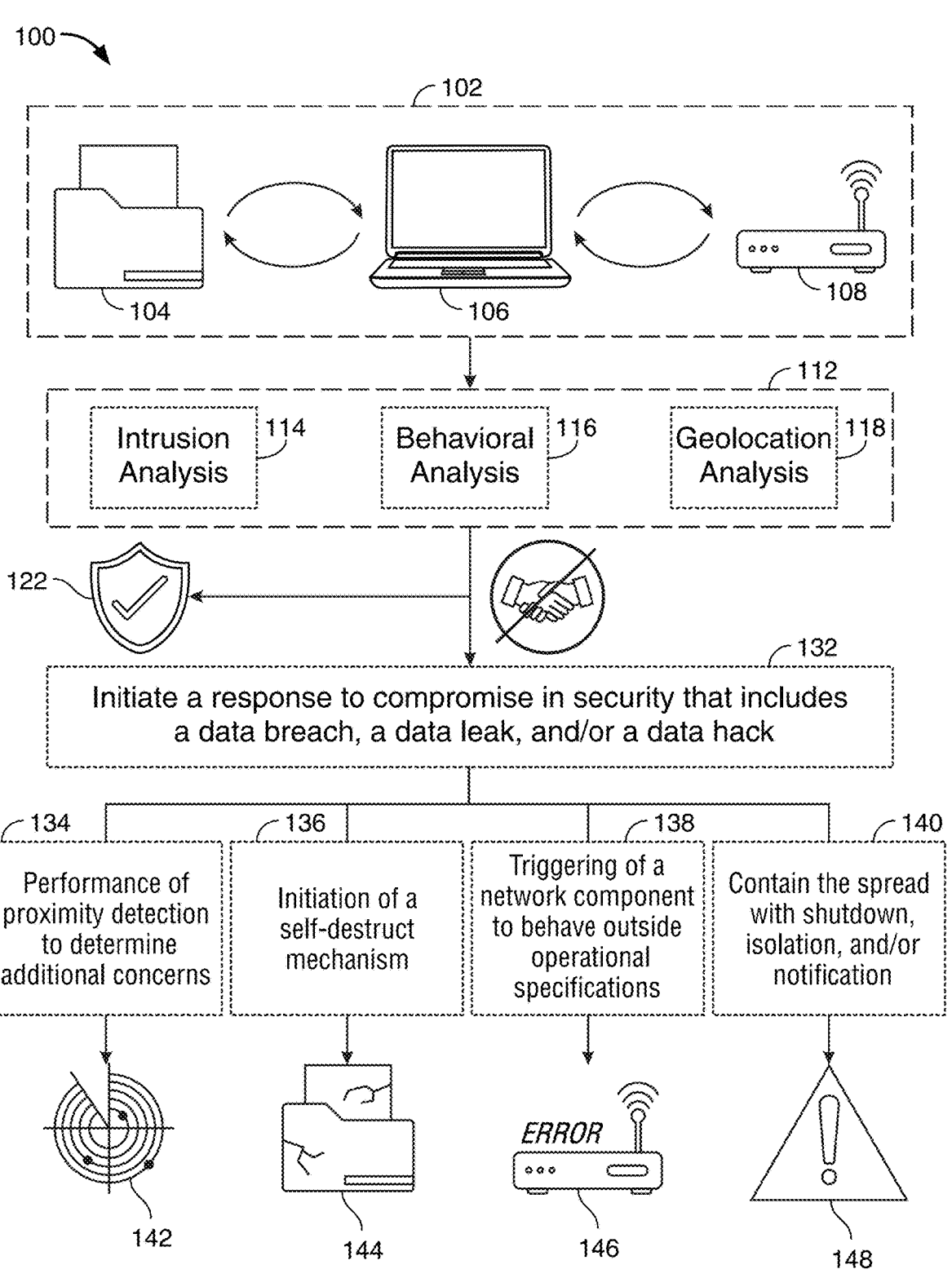
FIG. 1 shows an illustrative block diagram in accordance with principles of the disclosure.

The apparatus and method may include a system for the enhancement of security of data, code, and/or network components by introducing a layer of integrity management that adapts to changing conditions within a network.

Included may be a solution for mitigating an aftermath of a data breach, a data leak, and/or a data hack by a third party by ensuring the self-destruct of the third party's unauthorized and/or unauthenticated code and its immediate proximity.

Included may be a dynamic self-destruct apparatus and method for embedding code within the host's systems and/or data that activate upon detection of an unauthorized third party in the environment. By leveraging proximity-based detection and self-destruct mechanism, the impact of the data breach, data leak, and/or data hack may be minimized.

Included may be a multi-pronged apparatus and method. A self-destruct apparatus and method may operate at the code level, embedded within the host's software applications, scripts, or data repositories. When triggered by a breach detection system and/or security monitoring tool, indicating a breach by the third party, the mechanism may initiate a rapid and irreversible process that systematically destroys the host's compromised code and data. The breach detection system and/or security monitoring tool may include an intrusion detection system and/or an intrusion prevention system.

The apparatus and method may include wiping the host's and/or third party's storage devices, deleting files, and scrambling data structures to render them unusable. Additionally, the self-destruct mechanism may trigger host's and/or third party's hardware components to behave erratically and outside their proscribed operational specifications, such as overheating circuits, sustained over-clocking of processor chips, bypassing safety alarms, and/or triggering built-in destruction mechanisms in storage devices.

Proximity detection may provide capabilities to identify and target all host's components affected by a data breach, leak, or hack. Using machine learning algorithms and behavioral analysis techniques, the protocol may analyze network traffic, system logs, and user activity to determine the extent of the compromise.

Once identifying the host's affected components, the protocol may calculate the proximity of each host's component to the initial breach point. This may ensure inclusion of the host's compromised code, and data within proximity, in the self-destruct sequence.

Upon detection of a security breach into the host's systems, the apparatus and method may take immediate action to initiate the self-destruct sequence on the host's systems. This action may include triggering emergency shutdown procedures, isolating affected systems from the network, and/or alerting security personnel to investigate the breach further, each on the host's systems. The mechanism and protocol may operate autonomously, without requiring manual intervention, to ensure rapid response and mitigation of security threats.

The apparatus and method may introduce a unique approach to data security by offering an automatic self-destruct mechanism for host's code and data found in unauthorized or unauthenticated third party environments. Unlike traditional security measures that focus on prevention and detection, the protocol may follow initiative-taking action to mitigate the impact of data breaches, leaks, or hacks into the host's code and data by a third party.

By initiating a self-destruct sequence, the protocol ensures that host's compromised code and data, along with any related components that are near the host's components, if the host's compromised code and data are still within the host, or third party components if the host's compromised code and data is with the third party, are rendered inaccessible and irretrievable, thereby minimizing the potential damage caused by unauthorized access by the third party.

A combination of self-destruct mechanisms of compromised code, data, and/or network component, proximity detection capabilities of host and/or third party components, and/or immediate action protocols in the host's systems may depart from conventional security measures. Traditional approaches may focus on preventing and detecting security breaches of the host's systems and/or data. The disclosed apparatus and methods may include steps to mitigate the impact of unauthorized access by the third party. This approach may include automatically destroying the compromised code, data, and/or network component. This approach may ensure rapid response and mitigation of third party security threats.

The system may include a processor. The system may include a piece of data, a section of code, and/or a network component. The system may include an additional piece of data, section of code, and/or network component. The piece of data may include a data packet.

Configuration of the processor may provide for performance of intrusion analysis. Performance of intrusion analysis may use an intrusion detection system and/or an intrusion prevention system.

Configuration of the processor may provide for performance of behavioral analysis. Performance of behavioral analysis may include accessing user logs to see if behavior of a user of the piece of data, the section of code, and/or the network component is within a normal range of behavior based on predetermined criteria.

Configuration of the processor may provide for performance of geolocation analysis. Performance of geolocation analysis may include determining if the piece of data, the section of code, and/or the network component are within their usual surroundings based on predetermined criteria.

Configuration of the processor may provide for initiation of the performance of a response when the intrusion analysis, the behavioral analysis, and/or the geolocation analysis indicate a concern of a compromise in security. The compromise in security may include a data breach, a data leak, and/or a data hack.

The response may include performance of proximity detection to determine additional piece of data, section of code, and/or network component in physical proximity and/or functional proximity to the piece of data, section of code, and/or network component that has the concern of the compromise in security.

Functional proximity may be determined by analysis of network traffic, system logs, and/or user activity.

Physical proximity may be determined by analysis of relative locations to each other using GPS, cell phone towers, Wi-Fi access points, and/or an IP address location within a directory.

The response may include initiation of a self-destruct mechanism that is rapid and irreversible. The self-destruct mechanism may destroy the piece of data, section of code, and/or network component that has the concern of the compromise in security.

The self-destruct mechanism may destroy additional piece of data, section of code, and/or network component in functional proximity and/or physical proximity to the piece of data, section of code, and/or network component that has the concern of the compromise in security.

The response may include triggering the network component and/or the additional network component, when they are hardware, to behave outside their operational specifications. Behaving outside operation specifications may include overheating circuits, sustained over-clocking of processor chips, bypassing safety alarms, and/or triggering built-in destruction mechanisms.

The response may include containing the spread of the data breach, data leak, and/or data hack by triggering emergency shutdown procedures, isolating affected systems from the network, and/or alerting security personnel to investigate.

The network component and/or the additional network component may include hardware and/or software.

The user logs may include a recording of a set of user actions.

The geolocation of the piece of data, the section of code and/or the network component may be determined by using GPS, cell phone towers, Wi-Fi access points, and/or an IP address location within a directory.

The self-destruct mechanism may be embedded within software applications, scripts, and/or data repositories.

A method for enhancing security of data, code, and/or network component by introducing a layer of integrity management that adapts to changing conditions within a network.

The method may include use of a processor to perform intrusion analysis. Performance of intrusion analysis may use an intrusion detection system and/or an intrusion prevention system.

The method may include use of the processor to perform behavioral analysis. Performance of behavioral analysis may include accessing user logs to see if the behavior of a user of a piece of data, a section of code, or a network component is within a normal range of behavior based on predetermined criteria.

The method may include use of the processor to perform geolocation analysis. Performance of geolocation analysis may include determining if the piece of data, the section of code, or the network component is within its usual surroundings based on predetermined criteria.

The piece of data may include an encrypted data packet.

In computer networking, a data packet may include a small segment of a larger message. Data sent over a computer network, such as the Internet, may be divided into data packets. A computer or device may recombine the data packets it receives.

The method may include using the processor to embed an algorithm into an encrypted data packet. A data packet may contain a header, a payload that may also be called the body or data, and a trailer that may also be called the footer. The payload may contain enough storage size to include the algorithm. The algorithm may perform the step of validation of the encrypted data packet against predefined criteria.

The data packet may include a formatted unit of data carried by a packet-switched network. A data packet may include control information and a payload. The payload may include user data. The payload may include the data transmitted by the data packet. Control information may provide data for delivering the payload. This may include source and destination network addresses, error detection codes, and/or sequencing information. Packet headers and trailers may include the control information.

The payload of the data packet may contribute unique functionality to the data packet. For example, the design and/or the components of the payload may include a high-level security and integrity management that may protect the data packet when the latter finds itself in unauthorized or unauthenticated environments.

The processor may be configured to encrypt a data packet to create an encrypted data packet. The processor may be located and operated by a first party.

Encrypting a data packet may contribute to maintaining its content as confidential and private. A third party that captures a data packet to eavesdrop on network traffic between the two locations may be unable to read them. The third party may store the encrypted data packet awaiting improvements in decryption with the hope that what cannot be decrypted today may be decrypted tomorrow.

Functionalities may be coded into the payload of each data packet. For example, the functionalities of validation, location determination, and/or data erosion may be integrated into the payload of each data packet. These functionalities may be inherent components of the data's structure, or tagged onto the data, and activated under specific conditions.

One functionality may include integrated validation checks. The system may periodically check the embedded cryptographic signatures and time-sensitive markers against the source environment's parameters to ensure that the data remains within its secure, designated boundaries.

Another functionality may include activation of the erosion algorithm. The erosion algorithm may be embedded directly within the data packet. The erosion algorithm may be programmed to activate when unauthorized access is detected and/or when a check-in fails. The data packet itself may contain the logic and/or capability to begin self-destruct.

Further functionality may include real-time location checks. Geolocation data may be embedded within each packet. This geolocation data may aid in real-time monitoring and/or enforcement of geographical and network boundaries that may be crucial for compliance and security.

The algorithm may use geolocation analysis to determine if the encrypted data packet is within its usual surroundings based on predetermined criteria. The algorithm may perform the step of determination if the encrypted data packet is within a predetermined environment. The algorithm may destroy the encrypted data packet when the geolocation analysis fails.

Each encrypted data packet may contain, encoded within the payload, geolocation data. The geolocation data may help in determining whether the data has moved outside its authorized geographic or network boundary. That may be an essential feature for enforcing data governance and compliance with regional laws and regulations.

The encrypted data packet may run the algorithm at a predetermined frequency to perform geolocation analysis to determine if the encrypted data packet is within its usual surroundings based on predetermined criteria.

The encrypted data packet may run the algorithm to cause an irreversible destruction of the encrypted data packet when performance of the geolocation analysis determines that the encrypted data packet is outside its usual surroundings based on predetermined criteria.

When the intrusion analysis, the behavioral analysis, or the geolocation analysis indicate a concern of a compromise in security, a processor may initiate a response. The compromise in security may include a data breach, a data leak, and/or a data hack.

The response may include the processor performing proximity detection to determine additional piece of data, section of code, and/or network component in physical proximity and/or functional proximity to the piece of data, section of code, or network component that has the concern of the compromise in security. Determination of functional proximity may include analyzing network traffic, system logs, and/or user activity. Determination of physical proximity may include analyzing relative locations to each other using GPS, cell phone towers, Wi-Fi access points, and/or an IP address location within a directory.

The response may include the processor initiating a self-destruct mechanism that is rapid and irreversible. The self-destruct mechanism may destroy the piece of data, section of code, or network component that has the concern of the compromise in security. The self-destruct mechanism may destroy additional pieces of data, sections of code, or network component in functional proximity and/or physical proximity to the piece of data, section of code, and/or network component that has the concern of the compromise in security.

When the encrypted data packet is outside of the predetermined environment, the encrypted data packet may be configured to initiate the algorithm to cause the destruction of the encrypted data packet. The destruction of the encrypted data packet may be irreversible.

The destruction of the encrypted data packet may include fragmenting the packet, crumbling the packet, and/or breaking down the packet into something smaller. The result of these actions may result in destruction of the encrypted data packet.

The encrypted data packet may notify an authorized party with an alert message in real-time. The authorized party may be the party that originates the encrypted data packet, the destination party of the encrypted data packet, and/or another party. The alert message may include the nature of the breach. The alert message may include a timestamp of when the breach was noticed. It may include an identification of the affected encrypted data packet.

Notifying the authorized party in real-time may include notifying as soon as there is a detection of the failed validation attempt. It may include notification as soon as there is a detection that the data packet is outside of the predetermined environment.

Real-time may include a system in which input data is processed within milliseconds so that it is available virtually immediately as feedback.

The predetermined environment may include locations related to the first party. It may include locations related to the second party. It may include locations along a transportation route between the first party and the second party.

The response may include the processor triggering the network component and/or the additional network component when they are hardware, to behave outside their operational specifications. Behaving outside operation specifications may include overheating circuits, sustained overclocking of processor chips, bypassing safety alarms, and/or triggering built-in destruction mechanisms.

The response may include the processor containing the spread of the data breach, data leak, and/or data hack by triggering emergency shutdown procedures, isolating affected systems from the network, and/or alerting security personnel to investigate.

The network component and/or the additional network component may include hardware and/or software.

The user logs may include a recording of a set of user actions.

The processor may determine the geolocation of the piece of data, the section of code and/or the network using GPS, cell phone towers, Wi-Fi access points and/or an IP address location within a directory.

The processor may use a self-destruct mechanism embedded within software applications, scripts, and/or data repositories.

The predetermined frequency for running the algorithm may be one or more times per day.

The performance of the geolocation analysis may include receipt of an electronic heartbeat when the encrypted data packet is within its usual surroundings based on predetermined criteria. Failure of the encrypted data packet to receive the signal from the electronic heartbeat may prompt the algorithm to cause the irreversible destruction of the encrypted data packet.

The performance of the geolocation analysis may include receipt of an electronic heartbeat when the piece of data, the section of code, and/or the network component are within their usual surroundings based on predetermined criteria. Failure of the piece of data, the section of code, and/or the network component to receive the signal from the electronic heartbeat may indicate a concern of a compromise in security. The concern of the compromise in security may cause the processor to initiate a response. The response may include performance of proximity detection, initiation of the self-destruct mechanism, triggering hardware to behave outside its operational specifications, and/or containment of the spread of the data breach, data leak, and/or data hack.

The destruction of the encrypted data packet may include the degradation of the integrity of data in the encrypted data packet that may make it futile to interpret and/or reconstruct the content of the encrypted data packet.

The encrypted data packet may be encrypted with an encryption standard. The encryption standard may include the Triple Data Encryption Standard ("DES"), the Advanced Encryption Standard ("AES"), the Rivest, Shamir, and Adleman ("RSA") Security, Blowfish, Twofish, and/or combination thereof. The encryption standard may include other encryption standards.

Encrypting the data packet may include use of an encryption standard. Encrypting the data packet may include use of a post-quantum cryptography ("PQC") standard. The encryption standard and/or PQC may include Cryptographic Suite for Algebraic Lattices ("CRYSTALS")—Kyber, CRYSTALS—Dilithium, SPHINCS+, FALCON, and/or combinations thereof.

A goal of PQC may include the development of cryptographic systems that are secure against both quantum and classical computers. Another goal may include that the PQC can interoperate with existing communications protocols and networks.

The destruction of the encrypted data packet may include the degrading of the integrity of data in the encrypted data packet. Degrading the integrity of the data in the encrypted data packet may make it futile to interpret or reconstruct the data in the encrypted data packet.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments, such as apparatus and/or methods, may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative block diagram 100. Illustrative block diagram 100 may show interconnected computations system 102.

Interconnected computations system 102 may include piece of data 104, processor 106, and/or network component 108. Interconnected computations system 102 may include a section of code.

Processor 106 may determine various performance metrics 112 to determine the status and well-being of piece of data 104, network component 108, and/or the section of code.

Performance metrics 112 may include intrusion analysis 114, behavioral analysis 116, and/or geolocation analysis 118.

Intrusion analysis 114 may include the use of an intrusion detection system and/or an intrusion prevention system to identify presence of a third party in a host's interconnected computations system 102.

Behavioral analysis 116 may include accessing user logs to see if a behavior of a user of the piece of data, the section of code, and/or the network component is within a normal range of behavior based on predetermined criteria.

Geolocation analysis 118 may include determining if the piece of data, the section of code, and/or the network component are within their usual surroundings based on predetermined criteria.

When there is no concern identified based on the intrusion analysis, the behavioral analysis, the geolocation analysis, the system does not react and continues normal operations 122.

When identifying a concern, initiate response 132 to the compromise in security that includes a data breach, a data leak, and/or a data hack. The concern may include the intrusion analysis, the behavioral analysis, and/or the geolocation analysis.

Initiate response 132 may include proximity detection 142. Proximity detection 142 may include performance of proximity detection to determine additional concerns 134. Proximity detection 142 may determine additional piece of data, section of code, and/or network component that are in physical proximity and/or functional proximity to the piece of data, section of code, and/or network component that has the concern of the compromise in security.

Functional proximity may include determination by analyzation of network traffic, system logs, and/or user activity.

Physical proximity may include determination by analysis of relative locations to each other using GPS, cell phone towers, Wi-Fi access points, and/or an IP address location within a directory.

Initiate response 132 may include initiation of self-destruct mechanism 136 that is rapid and irreversible. The self-destruct mechanism may destroy the piece of data, section of code, and/or network component 144 that have the concern of the compromise in security.

The self-destruct mechanism may destroy additional piece of data, section of code, and/or network component in functional proximity and/or physical proximity to the piece of data, section of code, and/or network component that has the concern of the compromise in security.

Initiate response 132 may include triggering of behavior 146 that may include triggering of a network component to behave outside operational specifications 138. Triggering of behavior 146 may include the network component and/or the additional network component that are hardware to behave outside their operational specifications.

Behaving outside their operational specifications may include overheating circuits, sustained over-clocking of processor chips, bypassing safety alarms, and/or triggering built-in destruction mechanisms.

Initiate response 132 may include spread containment 148. Containing the spread with shutdown, isolation, and/or notification 140 may achieve spread containment 148.

Containing a spread 148 may include containing the spread of a data breach, a data leak, and/or a data hack by triggering emergency shutdown procedures, isolating affected systems from the network, and/or alerting security personnel to investigate.

FIG. 2A shows illustrative flowchart 200, beginning at step 202, that may provide a process for enhancing the security of data by introducing a layer of data integrity management that adapts to changing conditions within a data network.

At step 204, the processor may determine if a concern of a compromise in security is present by performing the following steps.

At step 206, the processor may perform intrusion analysis by use of an intrusion detection system and/or an intrusion prevention system.

At step 208, the processor may perform behavioral analysis by accessing user logs to see if a behavior of a user of a piece of data, a section of code, and/or a network component is within a normal range of behavior based on predetermined criteria.

At step 210, the processor may perform geolocation analysis by determining if the piece of data, the section of code, and/or the network component are within its usual surroundings based on predetermined criteria.

At step 212, the processor may initiate a response when the intrusion analysis of step 206, the behavioral analysis of step 208, and/or the geolocation analysis of step 210 indicate a concern of a compromise in security such as a data breach, a data leak, and/or a data hack. The response may include the following steps, starting at step 214, continued in FIG. 2B.

FIG. 2B may continue at step 214 from FIG. 3A, step 212. At step 214, the processor may perform proximity detection to determine additional pieces of data, sections of code, and/or network component in physical proximity and/or functional proximity to the piece of data, section of code, and/or network component that has the concern of the compromise in security.

At step 216, the processor may initiate a self-destruct mechanism that is rapid and irreversible that destroys the piece of data, section of code, and/or network component, which has the concern of the compromise in security. The processor may initiate a rapid and irreversible self-destruct mechanism to destroy additional piece of data, section of code, and/or network component that are in functional and/or physical proximity to the piece of data, section of code, and/or network component.

At step 214, analysis of network traffic, system logs, and/or user activity may contribute to the determination of functional proximity.

At step 216, analysis of the relative locations to each other may utilize GPS, cell phone towers, Wi-Fi access points, and/or an IP address location within a directory.

At step 218, trigger the network component and/or the additional network component that are hardware to behave outside their operational specifications.

At step 220, contain a spread of the data breach, data leak, and/or data hack by triggering emergency shutdown procedures, isolating affected systems from the network, and/or alerting security personnel to investigate.

At step 222, complete the response to a concern of a compromise of security.

FIG. 3A shows illustrative flowchart 300, beginning at step 302, that may provide a process for enhancing the security of data by introducing a layer of data integrity management that adapts to changing conditions within a data network.

At step 304, the processor may determine if a concern of a compromise in security is present by performing the following steps.

At step 306, the processor may perform intrusion analysis by use of an intrusion detection system and/or an intrusion prevention system.

At step 308, the processor may perform behavioral analysis by accessing user logs to see if the behavior of a user of a piece of data, a section of code, and/or a network component is within a normal range of behavior based on predetermined criteria.

At step 310, the processor may perform geolocation analysis by determining if the piece of data, the section of code, and/or the network component are within its usual surroundings based on predetermined criteria.

Geolocation may be determined by analyzing network traffic, system logs, and/or user activity to determine functional proximity.

Geolocation may be determined by analyzing the relative locations to each other utilizing GPS, cell phone towers, Wi-Fi access points, and/or an IP address location within a directory.

At step 312, the processor may embed an algorithm into an encrypted data packet. The piece of data may include the encrypted data packet. The algorithm may perform the following steps 314 and 316.

At step 314, the embedded algorithm may be able to perform geolocation analysis to determine if the encrypted data packet is within its usual surroundings based on predetermined criteria.

At step 316, the embedded algorithm may be able to perform destruction of the encrypted data packet when the geolocation analysis fails.

FIG. 3B the continue at step 318 from FIG. 3A, step 316. At step 318, the encrypted data packet may run the algorithm at a predetermined frequency to perform geolocation analysis to determine if the encrypted data packet is within its usual surroundings based on predetermined criteria.

At step 320, the encrypted data packet may run the algorithm to cause an irreversible destruction of the encrypted data packet. The algorithm may cause this destruction when performance of the geolocation analysis determines that the encrypted data packet is outside its usual surroundings based on predetermined criteria. The method may continue in FIG. 3B with step 322.

At step 322, the processor may initiate a response when the intrusion analysis of step 306, the behavioral analysis of step 308, and/or the geolocation analysis of step 310 indicate a concern of a compromise in security such as a data breach, a data leak, and/or a data hack. The response may include the following steps.

At step 324, the processor may perform proximity detection to determine additional piece of data, section of code, and/or network component in physical proximity and/or functional proximity to the piece of data, section of code, and/or network component that has the concern of the compromise in security.

At step 326, the processor may initiate a self-destruct mechanism that is rapid and irreversible that destroys the piece of data, section of code, and/or network component, which has the concern of the compromise in security. The processor may initiate a rapid and irreversible self-destruct mechanism to destroy additional piece of data, section of code, and/or network component that are in functional and/or physical proximity to the piece of data, section of code, and/or network component.

At step 328, trigger the network component and/or the additional network component that are hardware to behave outside their operational specifications.

At step 330, contain a spread of the data breach, data leak, and/or data hack by triggering emergency shutdown procedures, isolating affected systems from the network, and/or alerting security personnel to investigate.

At step 332, complete the response to a concern of a compromise of security.

Figure 4:
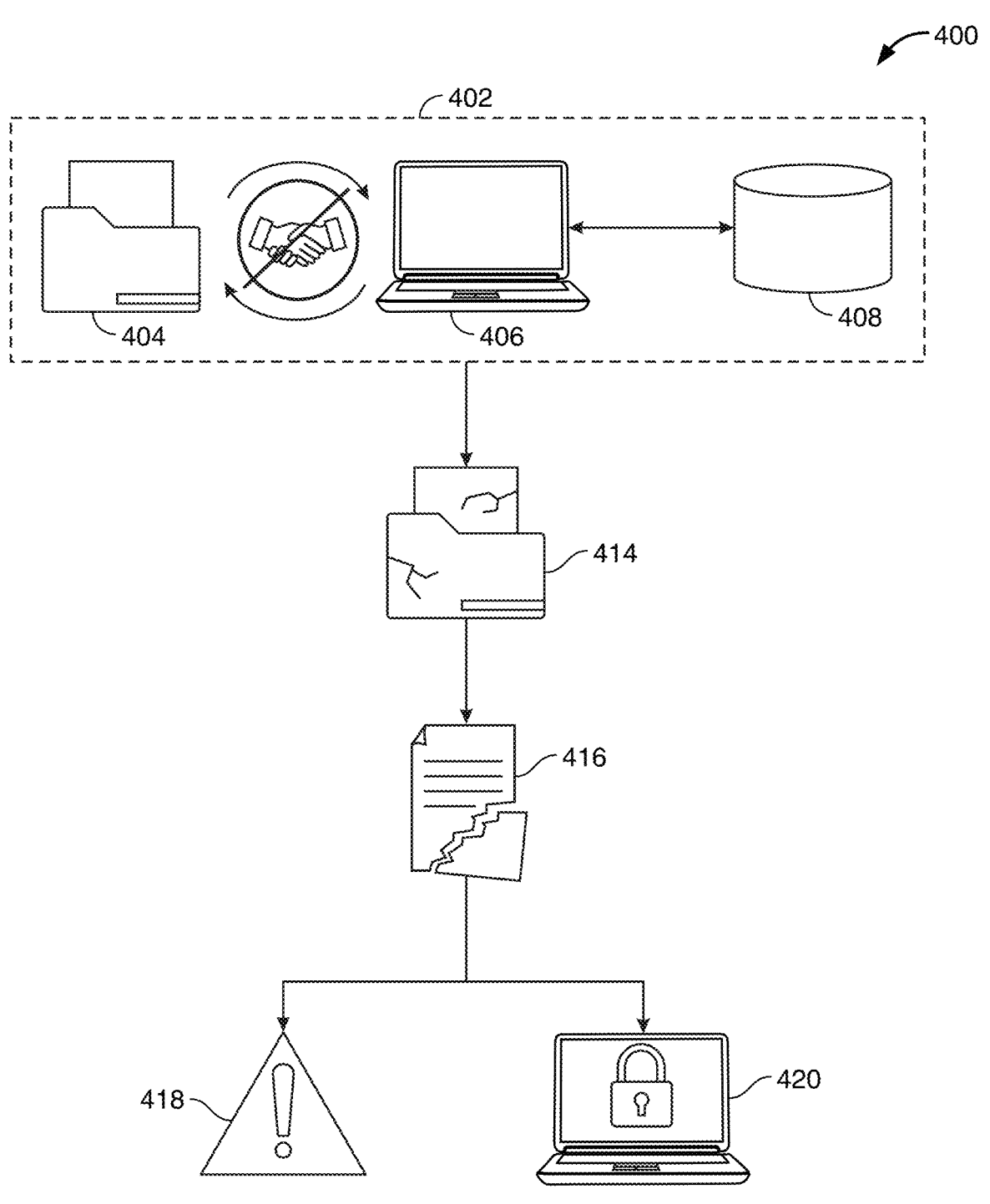
FIG. 4 shows an illustrative block diagram in accordance with principles of the disclosure.

FIG. 4 shows illustrative block diagram 400. Illustrative block diagram 400 may show a scenario where a malicious actor intercepts an encrypted data packet containing sensitive data. The sensitive data may include sensitive medical data, personal identification data, financial data, or the like. Illustrative block diagram 400 may detect the interception and protect the owner of the data.

Validation check 402 may include encrypted data packet 404. Validation check 402 may include processor 406. Validation check 402 may include data storage unit 408. The point of origin of encrypted data packet 404 may be processor 406, data storage unit 408, or both in electronic communication with each other.

Validation check 402 may be unsuccessful. An unsuccessful validation check may be due to a malicious actor intercepting the data packet. An unsuccessful validation check may be due to a data breach, a data leak, and/or a data hack.

Upon interception, breach, leak, and/or hack, the data packet may fail to validate its cryptographic signature during its routine check-in with a server leading to an unsuccessful validation check. The failed validation check may be due to tampering by the malicious actor and/or due to redirecting to another location leading to a location anomaly that causes the validation check to fail. The failed validation check may lead to an initial trigger.

The initial trigger may activate erosion algorithm 414. Erosion algorithm 414 may be embedded within the data packet. Erosion algorithm 414 may begin to alter the data packet's structure systematically and/or irreversibly. Erosion algorithm 414 may use a complex cryptographic transformation that scrambles and degrades data in the data packet.

Erosion algorithm 414 may proceed to progressive data destruction 416. Over time, the algorithm may intensify the destruction process, ensuring that even if some portions of the data are unencrypted and/or accessed, they are incomprehensible. The data's integrity and/or structure may be compromised. The compromise may be so extensive that reconstruction and/or decryption is impossible.

Concurrent to the initial trigger, activation of the erosion algorithm 414, and/or the progressive data destruction 416, the system may send alert 418 to a security team. Alert 418 may include details of the breach. Details may include a time, nature, and/or other specifics of the anomaly detected.

If set protocols are in place, further automated actions may be implemented such as lockdown 420 and/or network isolation. Initiation of these further automated actions may prevent widespread damage.

Figure 5:
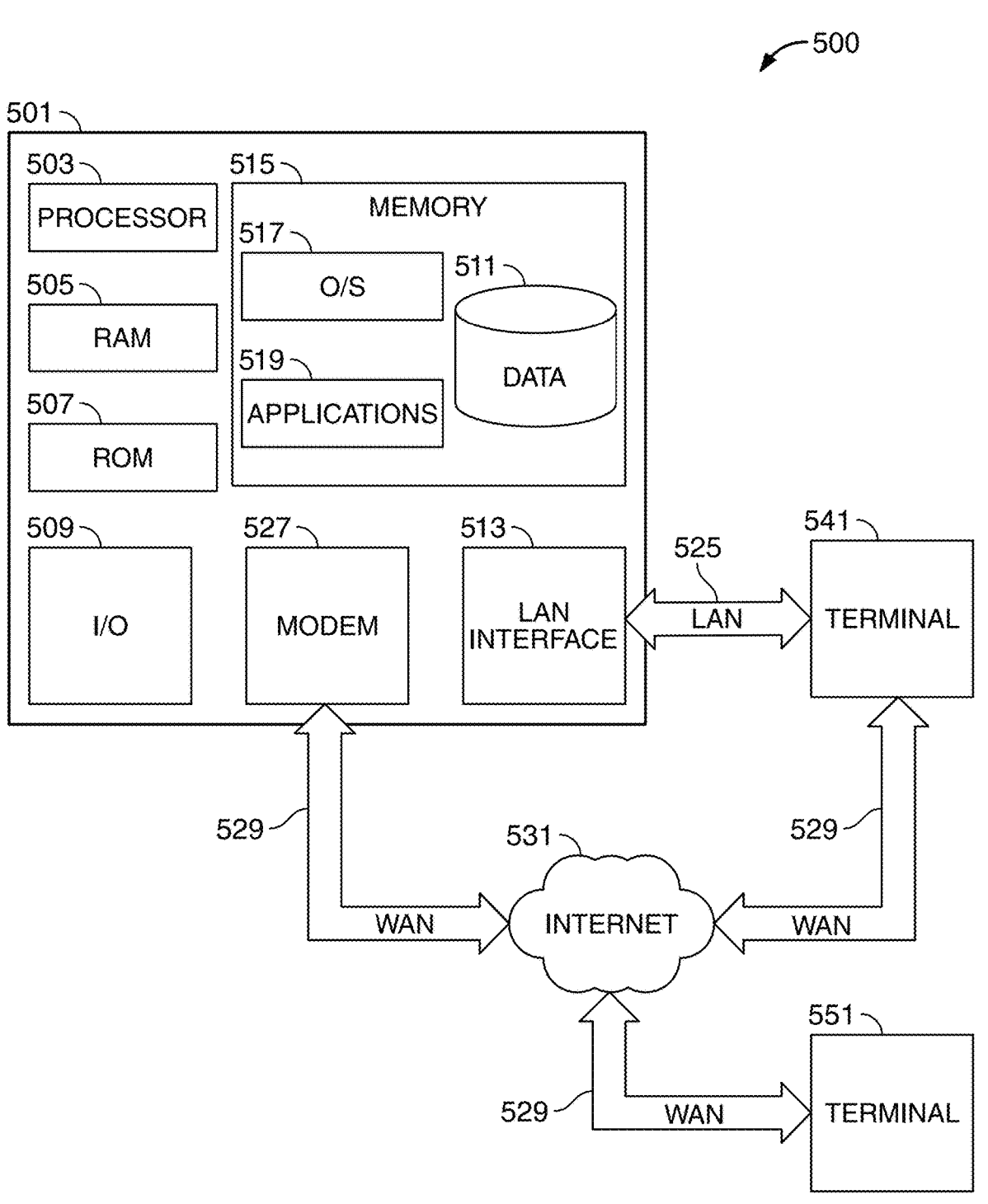
FIG. 5 shows an illustrative block diagram in accordance with principles of the disclosure.

FIG. 5 shows illustrative block diagram 500. Illustrative block diagram 500 may show an illustrative block diagram of apparatus 500 that includes a computer or computer system 501. Apparatus 500 may include one or more features of the apparatus shown in FIG. 1-4. Computer 501 may alternatively be referred to herein as a "computing device" or "computing system". Computer 501 may be a quantum computer or part of a quantum computer. Elements of apparatus 500, including computer 501, may be used to implement various aspects of the apparatus and methods disclosed herein. A "user" of apparatus 500 or computer 501 may include other computer systems or servers or computing devices, such as the program described herein.

Computer 501 may have one or more "N"-qubit processors as well as standard microprocessors 503 for controlling the operation of the device and its associated components, and may include RAM 505, ROM 507, input/output module 509, and a memory 515. The processors 503 may also execute all software running on the computer 501—e.g., the operating system 517 and applications 519. The processors 503 may establish quantum entanglement between qubits such as qubits in different locations. The processors 503 may run Quantum Error Correction ("QEC"). QEC may maintain coherence between entangled qubits. The processors 503 may establish correlation between qubits in different locations. Other components commonly used for computers, such as EEPROM or Flash memory or any other suitable components, may also be part of the computer 501.

The memory 515 may be comprised of any suitable permanent storage technology—e.g., a hard drive or other non-transitory memory. The ROM 507 and RAM 505 may be included as all or part of memory 515. The memory 515 may store software including the operating system 517 and application(s) 519 along with any other data 511 (e.g., historical data, configuration files) needed for the operation of the apparatus 500. Memory 515 may also store applications and data. Alternatively, some or all of computer executable instructions (alternatively referred to as "code") may be embodied in hardware or firmware (not shown). The microprocessor 503 may execute the instructions embodied by the software and code to perform various functions.

Memory 515 may store data as quantum states. Data may be transferred between qubits through quantum entanglement. Data may be stored on qubits as quantum states that are correlated to quantum states on other qubits. Data may be transferred between qubits through quantum entanglement.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) along with any data needed for the operation of the apparatus. The data may also be stored in cache memory, or any other suitable memory.

An input/output ("I/O") module 509 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 501, the processor or processors 503 may execute the instructions in all or some of the operating system 517, any applications 519 in the memory 515, any other code necessary to perform the functions in this disclosure, and any other code embodied in hardware or firmware (not shown).

In an embodiment, apparatus 500 may consist of multiple computers 501, along with other devices. A computer 501 may be a mobile computing device such as a smartphone or tablet.

Apparatus 500 may be connected to other systems, computers, servers, devices, and/or the Internet 531 via a local area network (LAN) interface 513.

Apparatus 500 may operate in a networked environment supporting connections to one or more remote computers and servers, such as terminals 541 and 551, including, in general, the Internet and "cloud". These remote computers and servers, terminals 541 and 551 (as well as other terminals, not shown) may be other quantum computers. Quantum computers may interact with each other over a quantum network. Quantum computers may interact with each other through quantum entanglement. References to the "cloud" in this disclosure may refer to the Internet, which is a worldwide network. "Cloud-based applications" may refer to applications located on a server remote from a user, wherein some or all the application data, logic, and instructions are located on the Internet and are not located on a user's local device. Cloud-based applications may be accessed via any type of internet connection (e.g., cellular or wi-fi).

Terminals 541 and 551 may be other quantum computers or servers that include many or all the elements described above relative to apparatus 500. The network connections depicted in FIG. 1-4 include a local area network (LAN) 525 and a wide area network (WAN) 529 but may also include other networks. Computer 501 may include a network interface controller (not shown), which may include a modem 527 and LAN interface or adapter 513, as well as other components and adapters (not shown). When used in a LAN networking environment, computer 501 is connected to LAN 525 through a LAN interface or adapter 513. When used in a WAN networking environment, computer 501 may include a modem 527 or other means for establishing communications over WAN 529, such as Internet 531. The modem 527 and/or LAN interface 513 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 519 (which may be alternatively referred to herein as "plugins," "applications," or "apps") may include computer executable instructions for a quantum authentication program and security protocols, as well as other programs. In an embodiment, one or more programs, or aspects of a program, may use one or more quantum authentication and AI/ML algorithm(s). The various tasks may be related to authenticating a user with a quantum computer.

Computer 501 may also include various other components, such as a battery (not shown), speaker (not shown), a network interface controller (not shown), and/or antennas (not shown).

Any information described above in connection with data 511, and any other suitable information, may be stored in memory 515. One or more of applications 519 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, multiprocessor systems, microprocessor-based systems, set top boxes, programmable consumer electronics, network PCs, minicomputers, mainframe computers, distributed computing environments that include any of the above systems or devices, quantum computers and the like.

Aspects of the invention may be described in the general context of computer-executable instructions, such as program modules, being executed by a computer. Program modules may include routines, programs, objects, components, data structures, etc., that perform tasks or implement abstract data types. The invention may also be practiced in distributed computing environments where tasks are performed by remote processing devices that are linked through a communications network, e.g., cloud-based applications. In a distributed computing environment, program modules may be in both local and remote computer storage media including memory storage devices.

Figure 6:
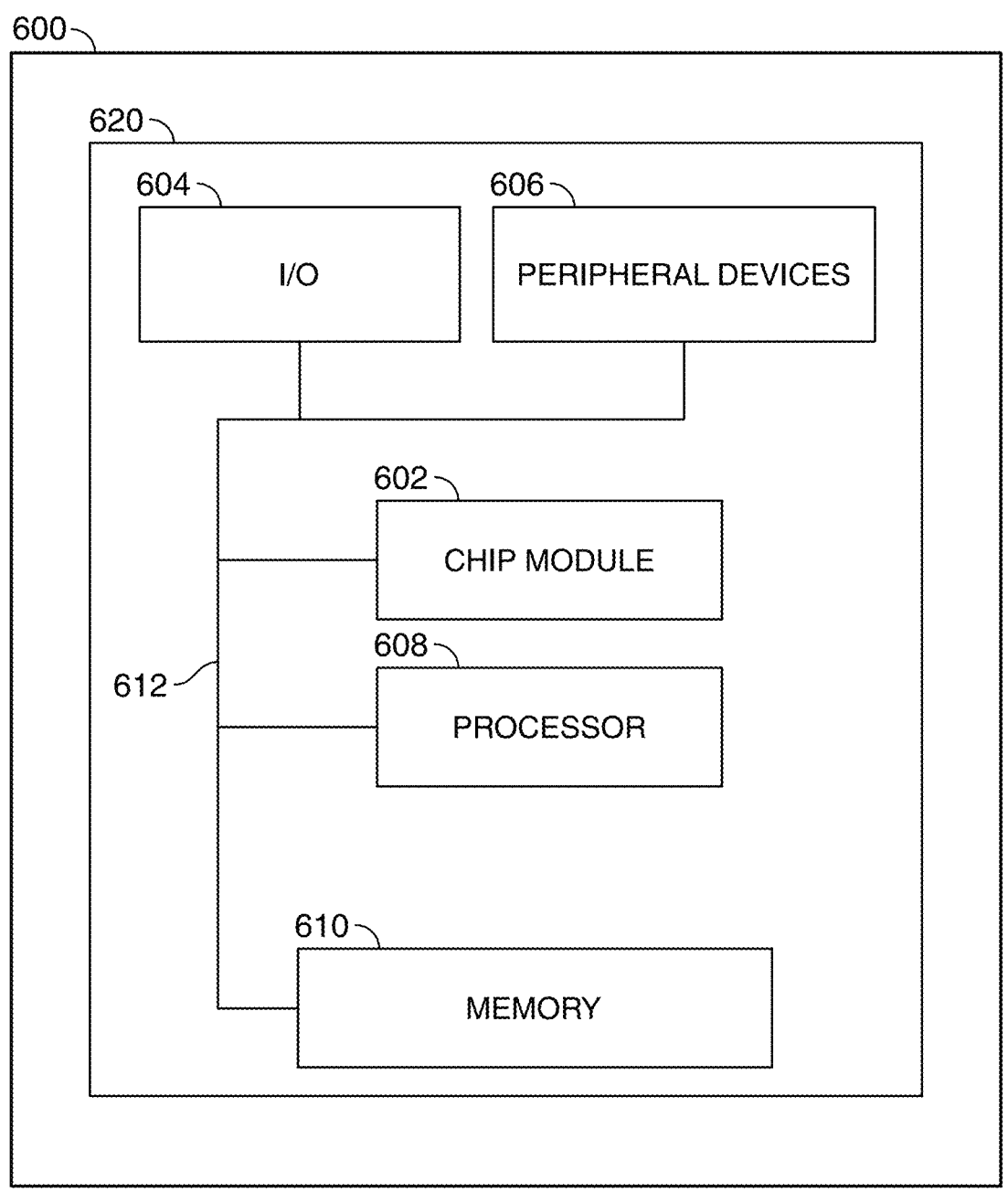
FIG. 6 shows an illustrative block diagram in accordance with principles of the disclosure.

FIG. 6 shows illustrative apparatus 600 that may be configured in accordance with the principles of the disclosure. Apparatus 600 may be a quantum computer, a server, or computer with various peripheral devices 606. Apparatus 600 may include one or more features of the apparatus shown in FIGS. 1-6. Apparatus 600 may include chip module 602, which may include one or more quantum and integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 606, which may include other computers, logical processing device 608, which may be quantum based and may compute data information and structural parameters of various applications, and machine-readable memory 610.

Machine-readable memory 610 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 602, 604, 606, 608 and 610 may be coupled together by a system bus or other interconnections 612 and may be present on one or more circuit boards such as 620. In some embodiments, the components may be integrated into a single chip. The chip may be silicon-based. The chip may be quantum-based.

Thus, provided may be systems and methods relating to the enhancement of data security by introduction of a layer of data integrity management that is adaptable to changing conditions within a data network. Persons skilled in the art will appreciate that the present invention can be practiced by other than the described embodiments, which are presented for purposes of illustration rather than of limitation. The present invention is limited only by the claims that follow.

What is claimed is:

1. A system for enhancement of security of network components by introducing a layer of integrity management that is adaptable to changing conditions within a network, the system comprising:

a processor;

a first network component;

a second network component;

said processor configured to:

perform intrusion analysis by use of an intrusion detection system or an intrusion prevention system;

perform behavioral analysis by accessing user logs to see if a behavior of a user of the first network component is within a normal range of behavior based on a first predetermined criteria;

perform geolocation analysis by determining if the first network component is within its usual surroundings based on a second predetermined criteria;

initiate a response when the intrusion analysis, the behavioral analysis, or the geolocation analysis indicate a concern of a compromise in security, said compromise in security comprising a data breach, a data leak, or a data hack, said response comprising:

performance of proximity detection to determine the second network component in physical proximity or functional proximity to the first network component that has the concern of the compromise in security;

wherein:

the functional proximity is determined by analyzation of network traffic, system logs, or user activity; and physical proximity is determined by analysis of relative locations to each other using GPS, cell phone towers, Wi-Fi access points, or an IP address location within a directory;

initiation of a self-destruct mechanism that is rapid and irreversible, where said self-destruct mechanism:

destroys the first network component that have the concern of the compromise in security; and destroys the second network component when said second network component is in the functional proximity or the physical proximity to the first network component that has the concern of the compromise in security;

triggering of the first network component or the second network component, that is hardware, to behave outside its their operational specifications;

wherein behaving outside their operational specifications comprises overheating circuits, sustained over-clocking of processor chips, bypassing safety alarms, or triggering built-in destruction mechanisms; and containing said compromise in security by triggering emergency shutdown procedures, isolating affected systems from the network, or alerting security personnel to investigate.

2. The system of claim 1 wherein the first network component or the second network component comprise hardware or software.

3. The system of claim 1 wherein the user logs comprise a recording of a set of user actions.

4. The system of claim 1 wherein geolocation of the first network component is determined by using GPS, cell phone towers, Wi-Fi access points, or an IP address location within a directory.

5. The system of claim 1 wherein the self-destruct mechanism is embedded within software applications, scripts, or data repositories.

6. A method for enhancing security of code by introducing a layer of integrity management that adapts to changing conditions within a network, the method comprising:

performing intrusion analysis, using a processor, by use of an intrusion detection system, or an intrusion prevention system;

performing behavioral analysis, using the processor, by accessing user logs to see if a behavior of a user of a first section of code are within a normal range of behavior based on a first predetermined criteria;

performing geolocation analysis, using the processor, by determining if the first section of code are within its usual surroundings based on a second predetermined criteria;

initiating a response, using the processor, when the intrusion analysis, the behavioral analysis, or the geolocation analysis indicate a concern of a compromise in security, said compromise in security comprising a data breach, a data leak, or a data hack, said response comprising:

performing, using the processor, proximity detection to determine a second section of code in physical proximity or functional proximity to the first section of code that has the concern of the compromise in security;

wherein:

the functional proximity is determined by analyzing network traffic, system logs, or user activity; and physical proximity is determined by analyzing relative locations to each other using GPS, cell phone towers, Wi-Fi access points, or an IP address location within a directory;

initiating, using the processor, a self-destruct mechanism that is rapid and irreversible, where said self-destruct mechanism:

destroys the first section of code that have the concern of the compromise in security; and destroys the second section of code, when said second section of code is in the functional proximity or the physical proximity to the first section of code that have the concern of the compromise in security;

and containing, using the processor, said compromise in security by triggering emergency shutdown procedures, isolating affected systems from the network, or alerting security personnel to investigate.

7. The method of claim 6 wherein the user logs comprise a recording of a set of user actions.

8. The method of claim 6 wherein geolocation of the first section of code is determined by using GPS, cell phone towers, Wi-Fi access points, or an IP address location within a directory.

9. The method of claim 6 wherein the self-destruct mechanism is embedded within software applications, scripts, or data repositories.

10. A method for enhancing security of data by introducing a layer of integrity management that adapts to changing conditions within a network, the method comprising:

performing intrusion analysis, using a processor, by use of an intrusion detection system or an intrusion prevention system;

performing behavioral analysis, using the processor, by accessing user logs to see if a behavior of a user of a first piece of data is within a normal range of behavior based on a first predetermined criteria;

performing geolocation analysis, using the processor, by determining if the first piece of data is within its usual surroundings based on a second predetermined criteria;

embedding, using the processor, an algorithm into an encrypted data packet, said algorithm for performing:

the geolocation analysis to determine if the encrypted data packet is within its usual surroundings based on the second predetermined criteria; and destruction of the encrypted data packet when the geolocation analysis fails;

wherein the first piece of data comprises the encrypted data packet;

running, using the encrypted data packet, the algorithm at a predetermined frequency to perform the geolocation analysis to determine if the encrypted data packet is within its usual surroundings based on predetermined criteria;

running, using the encrypted data packet, the algorithm to cause an irreversible destruction of the encrypted data packet when performance of the geolocation analysis determines that the encrypted data packet is outside its usual surroundings based on predetermined criteria;

initiating a response, using the processor, when the intrusion analysis, the behavioral analysis or the geolocation analysis indicate a concern of a compromise in security, said compromise in security comprising a data breach, a data leak, or a data hack, said response comprising:

performing, using the processor, proximity detection to determine a second piece of data in physical proximity or functional proximity to the first piece of data that has the concern of the compromise in security; wherein:

the functional proximity is determined by analyzing network traffic, system logs, or user activity; and physical proximity is determined by analyzing relative locations to each other using GPS, cell phone towers, Wi-Fi access points, or an IP address location within a directory, initiating, using the processor, a self-destruct mechanism that is rapid and irreversible, where said self-destruct mechanism:

destroys the first piece of data that has the concern of the compromise in security; and destroys the second piece of data when said second piece of data is in the functional proximity or the physical proximity to the first piece of data that has the concern of the compromise in security; and containing, using the processor, said compromise in security by triggering emergency shutdown procedures, isolating affected systems from the network, or alerting security personnel to investigate.

11. The method of claim 10 wherein the user logs comprise a recording of a set of user actions.

12. The method of claim 10 wherein geolocation of the first piece of data is determined by using GPS, cell phone towers, Wi-Fi access points, or an IP address location within a directory.

13. The method of claim 10 wherein the self-destruct mechanism is embedded within software applications, scripts, or data repositories.

14. The method of claim 10 wherein the predetermined frequency with which the algorithm is run is one or more times per day.

15. The method of claim 10 wherein the performance of the geolocation analysis comprises receipt of a signal from an electronic heartbeat when the encrypted data packet is within its usual surroundings based on predetermined criteria; and failure of the encrypted data packet to receive the signal from the electronic heartbeat prompts the algorithm to cause the irreversible destruction of the encrypted data packet.

16. The method of claim 10 wherein the performance of the geolocation analysis comprises receipt of a signal from an electronic heartbeat when the first piece of data are within their usual surroundings based on predetermined criteria; and failure of the first piece of data to receive the signal from the electronic heartbeat indicates the concern of the compromise in security thereby causing the processor to initiate the response comprising the performing proximity detection, initiating the self-destruct mechanism, and containing the compromise in security.

17. The method of claim 10 wherein the destruction of the encrypted data packet comprises degradation of an integrity of data in the encrypted data packet making it futile to interpret or reconstruct.

18. The method of claim 10 wherein the encrypted data packet is encrypted with an encryption standard, said encryption standard comprises Triple Data Encryption Standard ("DES"), Advanced Encryption Standard ("AES"), Rivest, Shamir, and Adleman ("RSA") Security, Blowfish, Twofish, Cryptographic Suite for Algebraic Lattices ("CRYSTALS")-Kyber, CRYSTALS-Dilithium, SPHINCS+, or FALCON.

* * * * *